Jan. 9, 1940.　　　G. EWALD ET AL　　　2,186,901
FOLDER MAKING MACHINE
Filed May 1, 1937　　　8 Sheets-Sheet 2

Inventor
Gustav Ewald,
Burns T. McGary,
By
Attorney

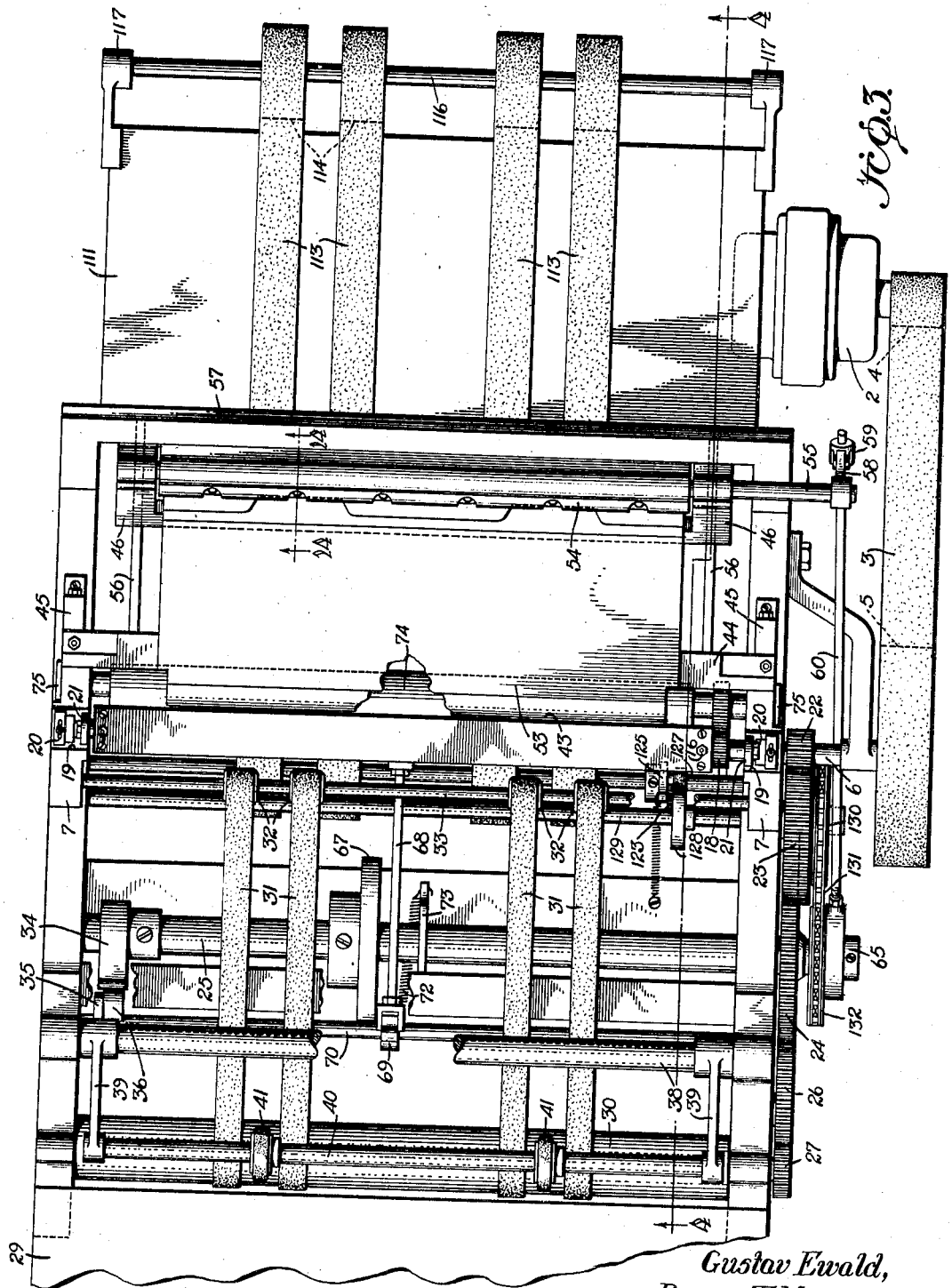

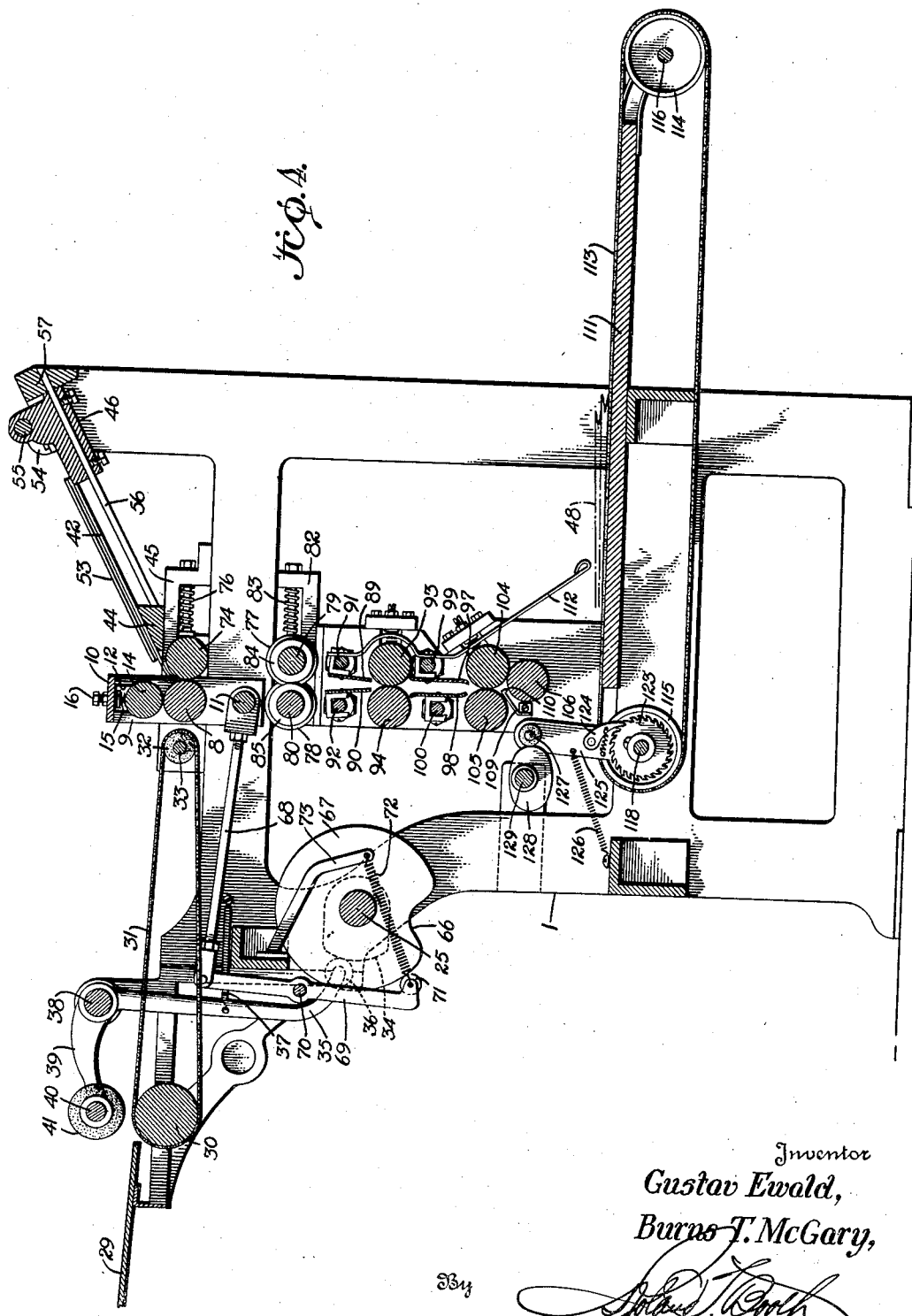

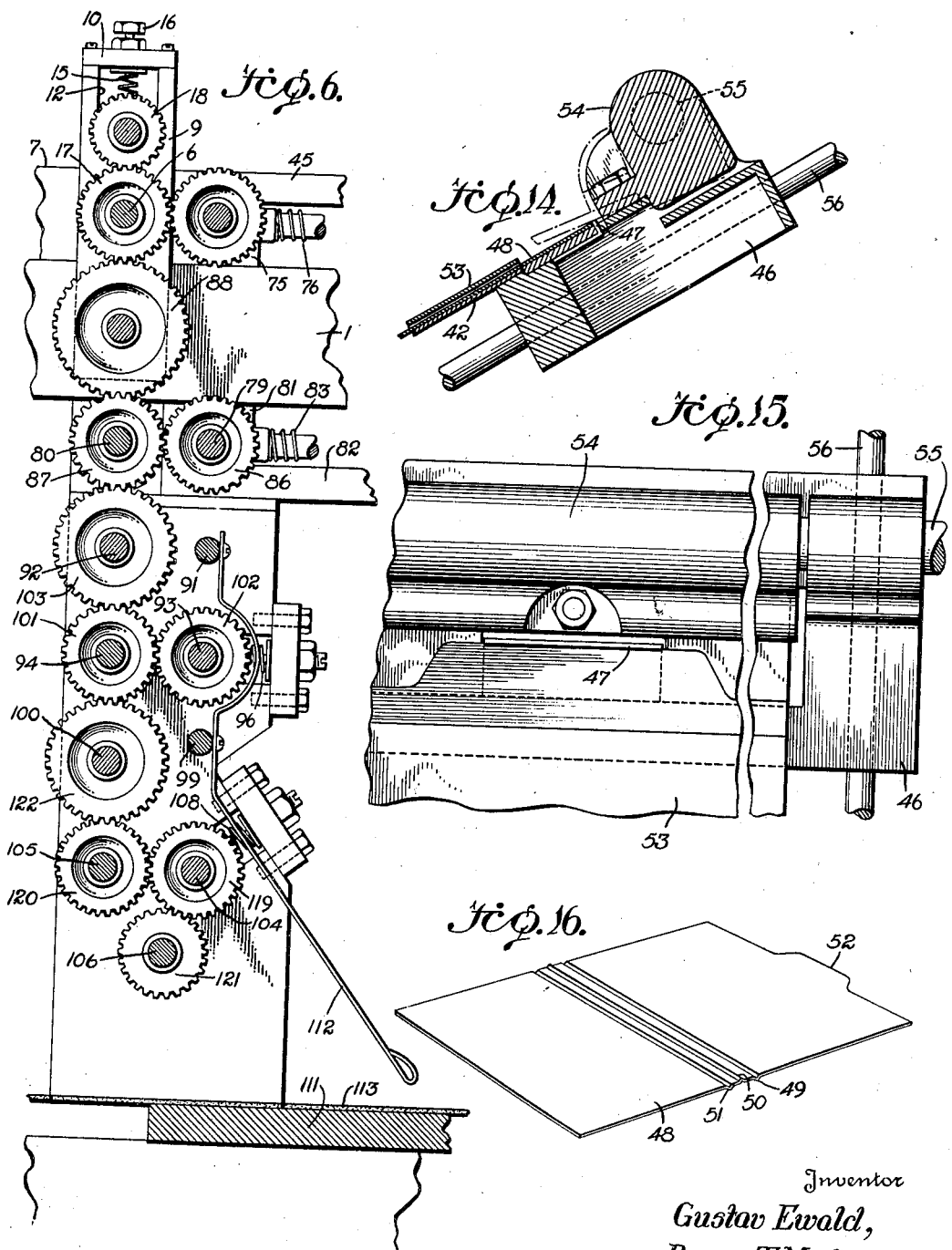

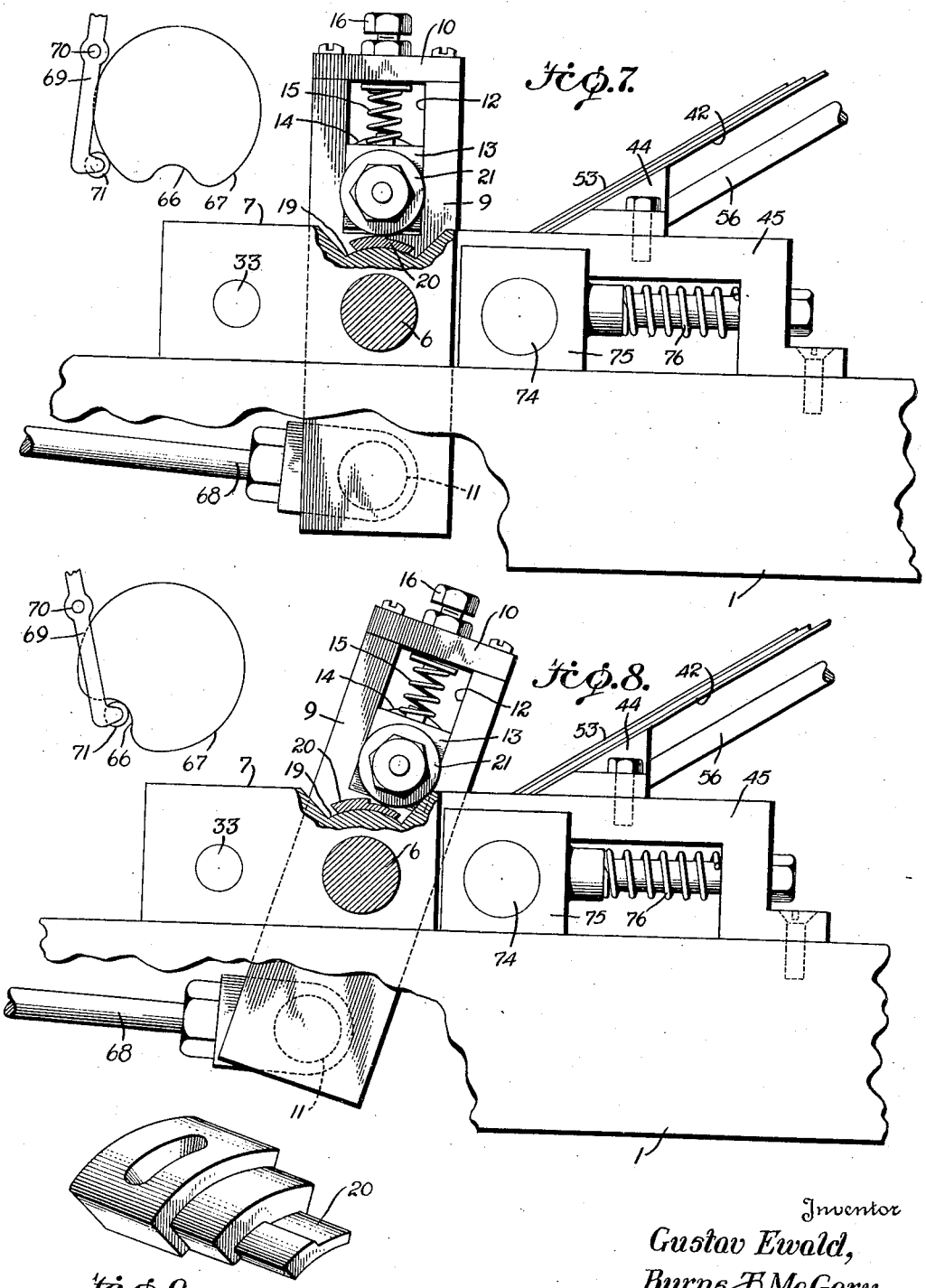

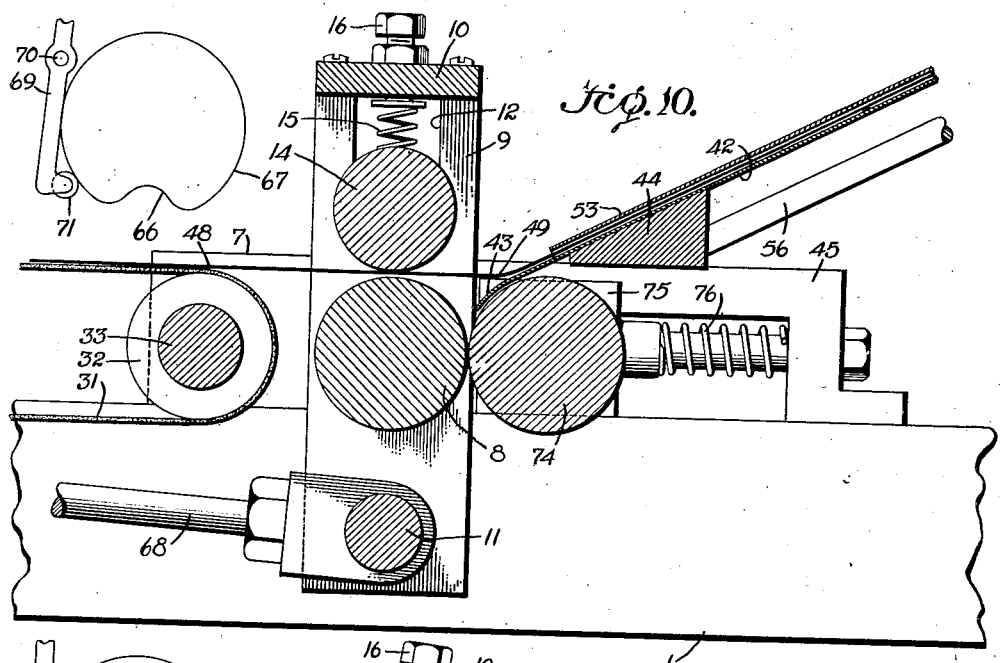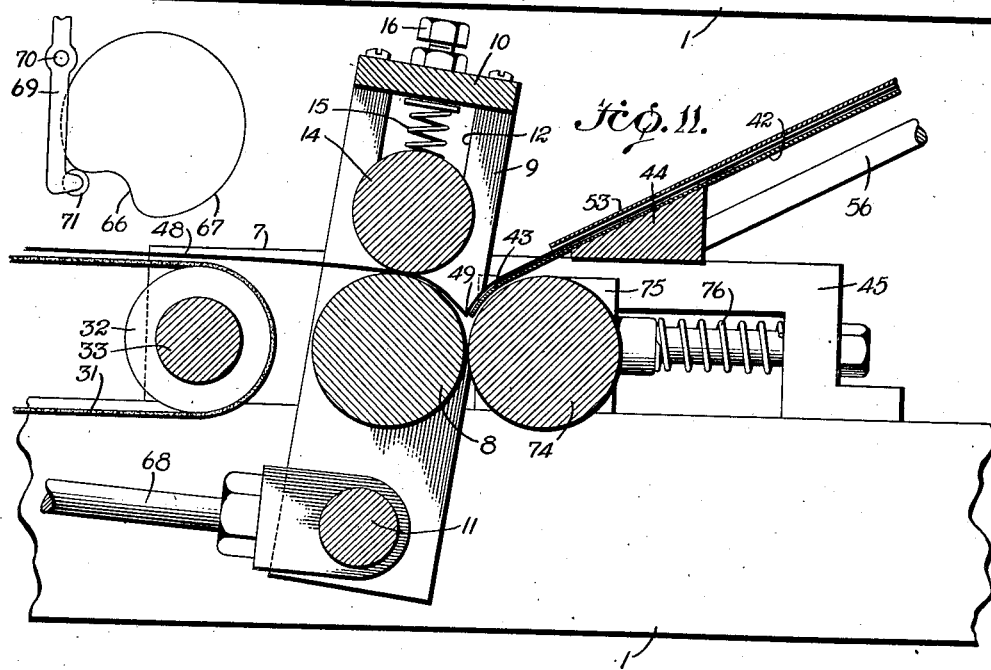

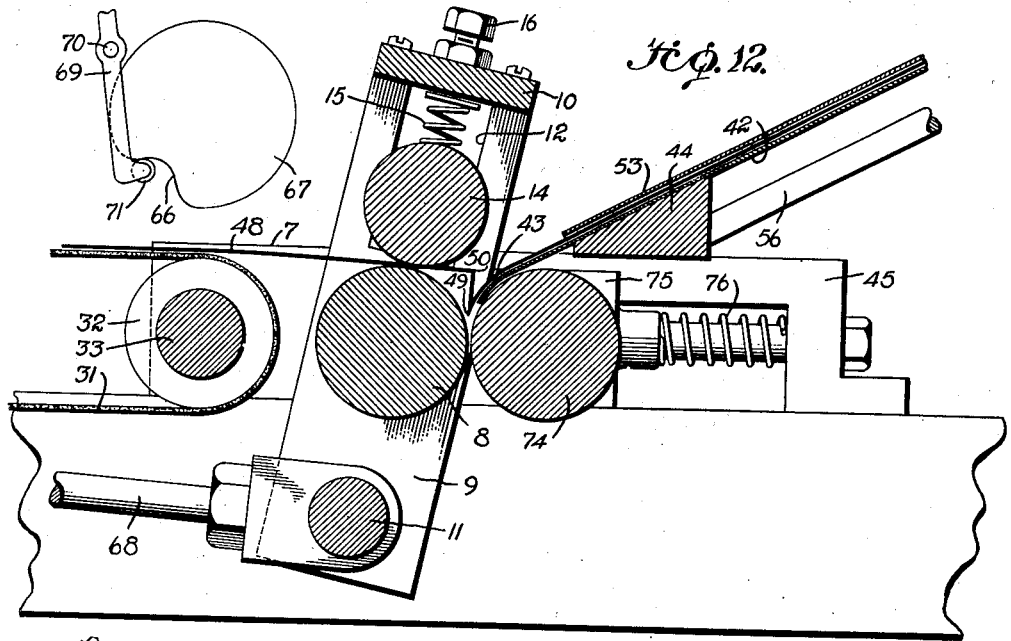
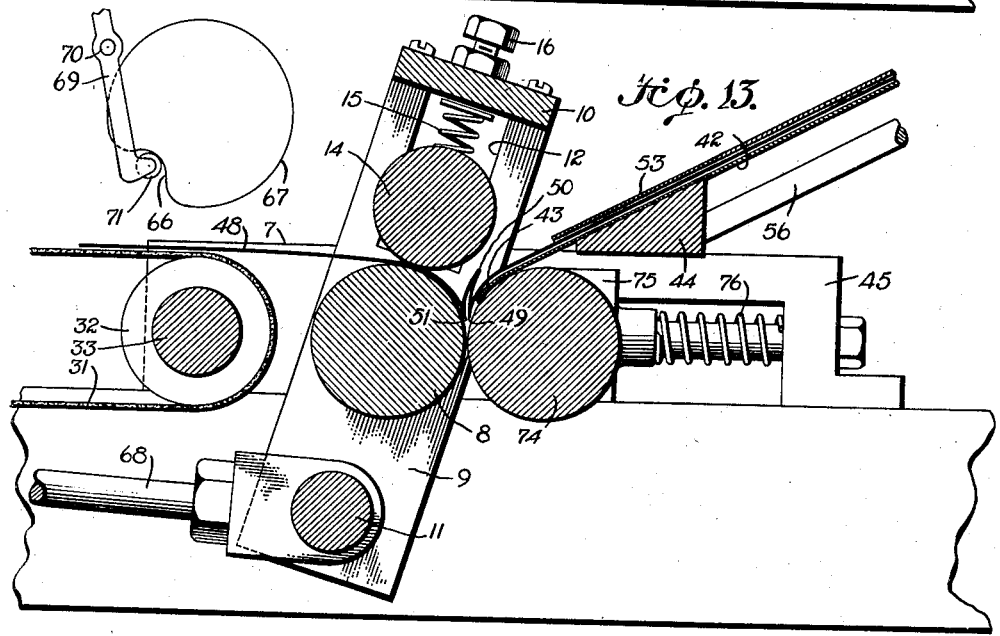

Patented Jan. 9, 1940

2,186,901

UNITED STATES PATENT OFFICE 2,186,901

FOLDER MAKING MACHINE

Gustav Ewald, North Tonawanda, and Burns T. McGary, Tonawanda, N. Y., assignors to Remington Rand Inc., Buffalo, N. Y.

Application May 1, 1937, Serial No. 140,240

24 Claims. (Cl. 93—1)

This invention relates to a method and machine for making correspondence folders, and particularly to a machine for making expansible correspondence folders formed with a series of reversely folded portions between the front and back covers of the folder, such folders being generally known as "W-type folders".

The invention comprehends the provision of a method for making expansible folders consisting in feeding paper sheets onto a holding and supporting device and causing the central portion of said sheet to alternately buckle in opposite directions by continually feeding one end of the sheet toward the other while being held in said supporting device to successively form a plurality of reversely extending fold portions, and subsequently creasing said fold portions and completing the folder.

The invention provides a machine for feeding paper sheets into a supporting and holding structure against a stop and then causing the buckling of the sheet alternately in opposite directions by continuing the feed of the sheets toward the stop, thereby forming a plurality of alternately extending fold portions, the machine subsequently feeding said folded sheet through a creasing mechanism for creasing the fold portions in the finishing operation of the folder.

The invention further comprehends the provision of a machine for feeding the paper sheets successively against a stop and by continued feeding of the sheet, it is caused to buckle in the central portion alternately in opposite directions to form a plurality of reversely extending fold portions in forming what is known as a "W-type folder," then delivering the folder in its folded form to suitable creasing mechanism, subsequently to a trimmer for trimming the folder to size, and finally delivering the folder from the machine in a convenient manner. It will be understood that the invention also contemplates the forming of two or more folders simultaneously from one sheet, in such a way, that the fold portions formed in the buckling of the sheet provides the fold of two or more folders that are arranged in end-to-end relation in the sheet, and after the creasing of the fold portions, a suitable cutting and trimming mechanism will trim the sheet and separate the folders from one another in the trimming operation, subsequently delivering two or more folders from the machine simultaneously. To facilitate accuracy in making "W-type folders" the paper sheets operated on by the machine may preferably be scored alternately on opposite sides in spaced parallel relation to define the lines of fold for the sheets previous to feeding into the machine.

Other features of the invention will be described in connection with the following detailed description and in the claims, it being understood that while the preferred method and machine construction for the production of these folders is illustrated, it is contemplated to cover equivalent means that fall within the scope of the appended claims.

In the drawings:

Fig. 3 is a plan view.

Fig. 4 is a vertical longitudinal cross section taken on line 4—4 of Fig. 3.

Fig. 6 is a fragmentary cross section taken approximately on line 6—6 of Fig. 2 showing the gearing for driving the folding, creasing, cutting and delivery rolls.

Figure 1:
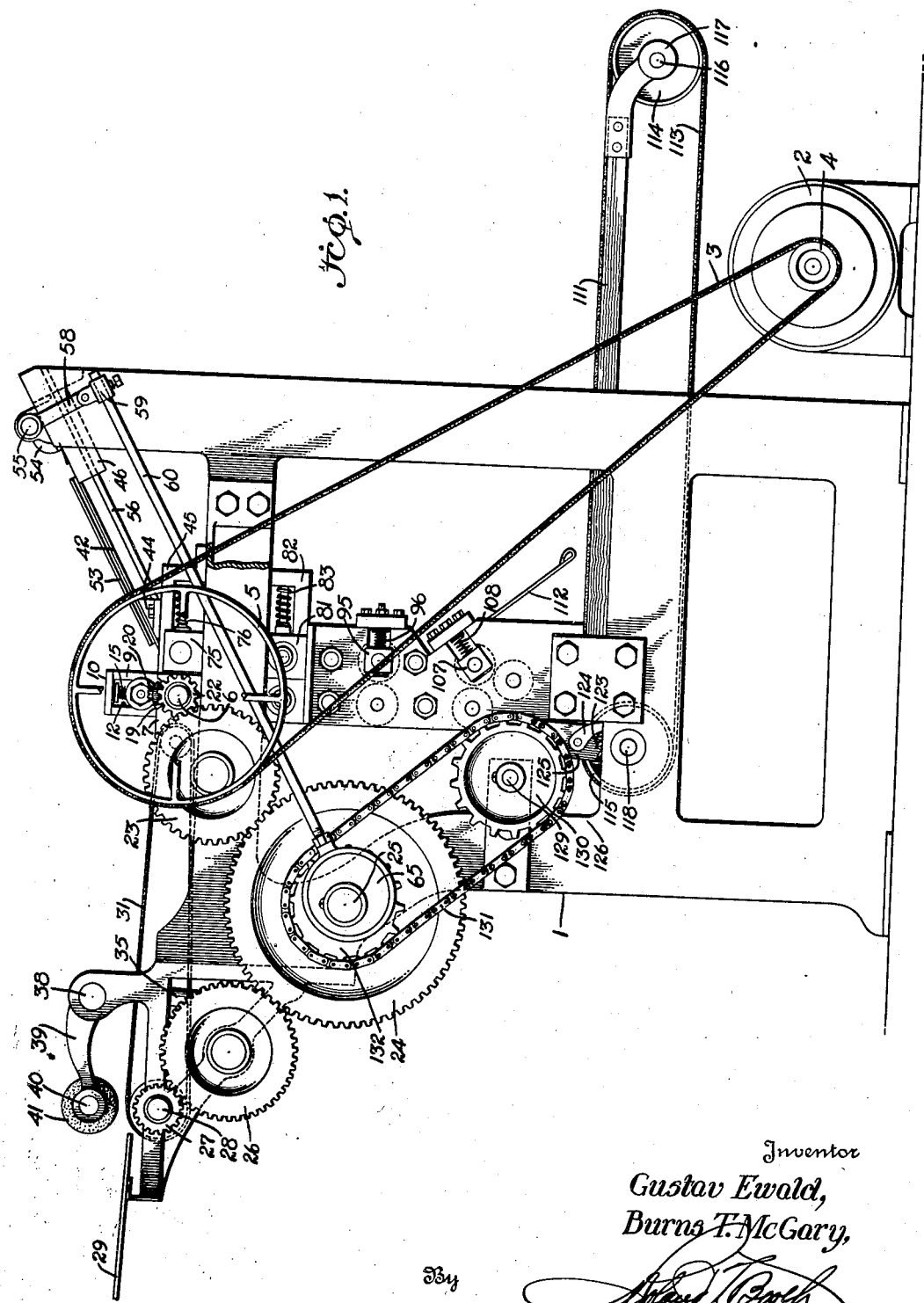
Fig. 1 shows the folder machine of this invention in side elevation.

Fig. 7 shows an enlarged fragmentary view of the fold forming mechanism in which this mechanism is shown in end elevation while adjacent portions of the machine frame are shown in elevation and partly in section, the view being somewhat diagrammatic for convenience in illustrating features of construction of the folding mechanism, and includes a diagrammatic view of the actuating cam and lever to illustrate the position of the cam for the illustrated position of the fold-forming mechanism.

Fig. 8 is a view similar to Figure 7 illustrating the fold-forming mechanism at the opposite limit of its movement from that shown in Fig. 7.

Fig. 9 illustrates the cam that controls the operation of the folding and feed rolls of the folding mechanism, in perspective.

Figs. 10, 11, 12 and 13 show enlarged fragmentary cross sections through the folding, feeding and creasing mechanism illustrating successive positions of this mechanism; showing the various steps of operation produced on a sheet of paper in forming the series of folds in successive relation to form a W-type folder; and each of these views includes a diagrammatic illustration of the cam and actuating lever for the folding frame showing the position of the cam for the respective positions of the folding frame in the folding operation.

Fig. 14 is an enlarged cross section through the tab cutter taken on line 14—14 of Fig. 3.

Fig. 15 is an enlarged fragmentary plan view of the tab cutter.

Fig. 16 shows a folder sheet in perspective, scored, opened into flat position and formed with a tab.

The machine includes a main frame 1 formed of a pair of side frame members having a plurality of cross members connecting these side frames that are not being specifically referred to because the main frame may be constructed in any desired manner to support the various mechanism that operates on the paper sheets to produce the folders. This machine is mounted on a suitable base or floor, and electric motor 2 is located adjacent to the frame on one side, connected by belt 3 engaged over motor drive pulley 4 and main drive pulley 5 of the folder machine.

Pulley 5 is mounted on the end of shaft 6 rotatable in bearing blocks 7 mounted on top of the side frames. Besides forming the main drive shaft for the various mechanism on the machine, shaft 6 mounts main feed and folding roll 8 between the side frames.

A rock frame has end members 9 and cross bar 10 connecting the upper ends of said end members, rotatably mounted on shaft 6 with end members 9 disposed just inwardly of the side frames. The lower ends of end members 9 of the rock frame are connected by bar 11 while the upper ends of end members 9 are slotted at 12 to slidably receive bearing blocks 13 rotatably mounting secondary feeding and folding roll 14. Coil springs 15 mounted between bearing blocks 13 and the ends of bar 10 in slots 12 have their compression adjustable by means of a suitable bolt 16 threaded in the ends of bar 10 so that secondary feed and folding roll 14 is normally urged toward main feed and folding roll 8 until their peripheries engage.

Drive gear 17 mounted on shaft 6 (see Fig. 6), just inside one of the side frames meshes with driven gear 18 on the end of secondary feed and folding roll 14 for driving secondary roll 14 in unison with said main feed and folding roll 8 in the operation of said machine so that their peripheries travel at a uniform speed. It will be understood that while secondary folding roll 14 has limited vertical movement in the manner hereafter described to disengage its periphery from main folding roll 8, that the teeth on gears 17 and 18 will still continue to mesh sufficiently to normally drive secondary folding roll 14.

Bearing blocks 7 are recessed on the upper face as indicated at 19 in Fig. 7 to provide a cylindrical surface concentric with the axis of shaft 6. Control cams 20 are mounted on the cylindrical portion of recesses 19 and rollers 21 mounted on the ends of secondary feed and folding roll 14 have peripheral engagement with cams 20, so that when these rollers engage the high part of the cam secondary folding roll 14 is disengaged from peripheral contact with main folding roll 8. When the rock frame carrying secondary folding roll 14 is moved in a clockwise direction as shown in Fig. 7, to the position illustrated in Fig. 8, it will be seen that rollers 21 will move off the high part of the cams onto the low part so secondary folding roll 14 will have peripheral engagement with main folding roll 8 and a paper sheet may be gripped between said rolls for feeding and folding in a manner hereinafter described. The operation of secondary folding roll 14 is controlled entirely by cams 20 and the rock frame according to the position thereof on shaft 6.

A drive pinion 22 is mounted on shaft 6 on the outside of the main frame as shown in Figs. 1 and 3, for driving idle gear 23 rotatably mounted on one side of the main frame. Idle gear 23 in turn meshes with and drives gear 24 mounted on cam shaft 25 rotatable in suitable bearings in the main frame. Gear 24 also drives idle gear 26 as shown in Fig. 1 which in turn drives gear 27 on shaft 28 rotatably mounted in main frame 1 at the left-hand end of the machine as shown in Fig. 1 where paper sheets for making folders are fed into the machine. Shaft 28 drives the sheet feeding mechanism that conveys sheets into the folding mechanism.

A suitable supporting table 29 is mounted on the frame as shown in Fig. 1 to support sheets for feeding into the machine to be folded. One edge of this table terminates adjacent shaft 28. The feed mechanism includes a roll 30 mounted on shaft 28 having endless belts 31 engaged on its periphery in spaced parallel relation. Belts 31 are also engaged over smaller rolls 32 mounted on shaft 33 arranged in spaced parallel relation to shaft 28 and having the ends rotatably mounted in bearing blocks 7 adjacent to and in substantially horizontal relation with shaft 6. It will be seen that through the chain of gearing above described the driving of shaft 28 will drive endless belts 31 so that sheets fed onto said belts will be conveyed toward folding rolls 8 and 14. This feeding of the sheets is obtained in a special manner that will now be described.

A cam 34 is mounted on cam shaft 25 adjacent one side frame as shown in Fig. 3. This cam actuates arm 35 having roller 36 riding on the periphery thereof so that said arm is oscillated back and forth in accordance with the portion of the periphery of the cam engaged with roller 36. Tension spring 37 normally keeps roller 36 in engagement with the face of cam 34. The opposite end of arm 35 is carried by transversely extending shaft 38 rotatably mounted in bearing extensions on the side frames. Shaft 38 carries a pair of laterally projecting arms 39 rotatably supporting shaft 40 in bearings formed in the free ends thereof. Shaft 40 carries feed rollers 41 arranged in spaced relation on shaft 40 as shown in Fig. 3, positioned to engage the periphery of roll 30 between adjacent pairs of feed belts 31. When cam 34 moves to a position as shown in dotted lines in Fig. 4, arm 35 is operated to elevate feed rollers 41 above belts 31 and in this position they will not operate to engage and feed sheets along belts 31 toward the folding rolls. When the cam moves to an opposite position so that roller 36 on arm 35 can move toward shaft 25, feed rollers 41 will move downwardly, as shown in Fig. 4, toward feed roll 30 and when a sheet of paper is positioned with its edge between rollers 41 and feed roll 30, it will be gripped therebetween to positively feed the sheet from table 29 and carry it toward feed rolls 8 and 14 on belts 31. This feeding of the sheet occurs when the portion of the cam of smaller radius has roller 36 engaged with its periphery.

This feed mechanism successively feeds sheets one at a time toward and between folding rolls 8 and 14 when these folding rolls have their peripheries disengaged with rollers 21 on the high portions of cams 20 and the rock frame carrying folding roll 14 in the vertical position shown in Fig. 7. The successive feeding of sheets is timed by the operation of feed rollers 41. Belts 31 will convey and feed sheets between folding rolls 8 and 14 in disengaged relation until the forward edge slides over supporting and guide plate 42 into engagement with a stop.

Guide plate 42 has one edge adjacent the folding roll 8 formed to provide a curved folding extension 43 as shown in Fig. 10, the remainder of the plate extending from folding roll 8 upwardly in angular relation away from this roll. Plate 42 is supported by transverse bar 44 carried on top of the frame member by guide brackets 45 secured on top of the side frames at one end of bearing blocks 7 as clearly shown in Fig. 7. The opposite end of guide and supporting plate 42 is connected to and supported by stationary bar 46 of the tab cutter.

Stationary bar 46 has paper stops 47 (Fig. 14), for engaging the edge of a paper sheet fed by belts 31 for arresting motion of the sheet and providing a gauge adjustable to determine the extent of tab cutting on the edge of the sheet and also for determining the position of the sheets for the desired folding operation.

When belts 31 feed a sheet through folding rolls 8 and 14 it will engage supporting and guide plate 42 and be moved slidably over this plate until the forward edge of the sheet engages stops 47. One of these sheets is indicated in Fig. 16 at 48 and has its central portion scored transversely at 49, 50 and 51, the scoring 50 being on the opposite side of the sheet from the scorings 49 and 51. Stops 47 are set at a distance from folding rolls 8 and 14 sufficient for sheet 48 to be fed through folding rolls 8 and 14 until the edge engages the stops in position for tab cutting of the tab 52, while transverse scoring 49 will at the same time be positioned to the right of folding roll 8 as shown in Figs. 10 and 11. This adjustment is made for each change in the size of the folder.

A cover sheet 53 is mounted in spaced parallel relation above supporting and guide plate 42 as clearly shown in the drawings and serves to hold sheets 48 from buckling intermediate stops 47 and curved folding lip 43.

The tab cutter has a movable cutting member 54 mounted on shaft 55 rotatable in bearing portions carried by stationary bar 46. The tab cutter is a construction well known in the art and a specific description of the details thereof is not believed to be necessary. Therefore, reference is only being made to the essential parts in order to describe the arrangement and timing of the operation thereof in conjunction with the other features of the machine in performing the invention. Stationary bar 46 of the tab cutter is slidably mounted on rails 56 having one end of each secured to transverse bar 44 and the opposite ends mounted on cross bar 57 extending between the side members of the main frame. Suitable bolts secure stationary bar 46 and the entire tab cutter mechanism in adjusted position on rails 56. The adjustment of bar 46 adjusts stops 47 for the purposes above described. For each adjustment of bar 46 a guide plate 42 of proper dimension is inserted in place of wider or narrower plates 42. An actuating arm 58 is mounted on shaft 55 at one end thereof outside of the frame of the machine as clearly shown in Figs. 1 and 3 and at the free end has a block 59 pivoted thereon to adjustably receive rod 60. Rod 60 has an eccentric collar at the opposite end operably engaged with eccentric 65 mounted on cam shaft 25 at an angle of approximately eighty-five degrees to the radius of the center of cam recess 66 of operating cam 67 for the folding mechanism. Cam 67 is also mounted on shaft 25 and the position of eccentric 65 follows in a clockwise direction behind notch 66 of cam 67 in the position of these parts as shown in Figs. 1 and 4. This will secure the operation of the tab cutter to cut the edge of the sheet against stop 47 to form tab 52 of the folder prior to the time that the folder folding mechanism goes into operation.

Cross bar 11 connecting side members 9 of the rock frame has link 68 pivotally connected thereto at one end, and at the opposite end, it is provided with a clevis pivotally connected with rock arm 69 mounted on shaft 70 having its opposite end rotatable in bearings on the side members of the main frame. The opposite end of rock arm 69 mounts roller 71 adapted to ride on the periphery of cam 67. A tension spring 72 is connected to the end of rock arm 69 adjacent roller 71 and has its opposite end connected to the end of bracket 73 mounted on the main frame for normally operating rock arm 69 to maintain roller 71 in engagement with the periphery of cam 67.

After the tab cutter above described has operated to cut the tab on a sheet fed against stops 47 by belts 31, cam 67 then rotates from a position such as illustrated in Fig. 10 to the position of Fig. 11 whereupon roller 71 begins to ride into the recess or dwell 66 of cam 67. As shown in Fig. 11 roller 71 in beginning to ride into recess 66 of cam 67 causes the rock frame carrying secondary folding roll 14 to begin to rotate on shaft 6 so that when the position of Fig. 11 is reached rollers 21 will begin to ride down off of the high part of cams 20 and allow secondary folding roll 14 to grip folder sheet 48 between its periphery and the periphery of folding roll 8. These rolls being continuously rotated in the operation of the machine will immediately begin to forcibly feed the sheet toward the stop, and since the sheet has already engaged the stop, and also since the frame is rocking in the direction of feeding the sheet, this tends to buckle the sheet adjacent to the folding rolls 8 and 14 downwardly as shown in Fig. 11. This downward buckling of the sheet is aided by the curved lip 43 on supporting plate 42 which cooperates with these folding rolls in the folding of the sheet. The first fold will thereby be formed as indicated in Fig. 11 through each sheet buckling downward and forming the fold along the first score line 49.

As cam 67 continues to rotate and the feeding and folding rolls 8 and 14 continue to feed the sheet from the position shown in Fig. 11, it will be seen that the rock frame continues its rotation around shaft 6, at the same time feeding the sheet forwardly toward stops 47. This necessarily causes the sheet to continue buckling and this time it buckles upwardly as shown in Fig. 12 so that the sheet will fold along the second score line 50 in the manner indicated in Fig. 12. The continued operation of folding rolls 8 and 14 and the continued rocking movement of the rock frame caused by the operation of cam 67 continues to feed the sheet forwardly toward stops 47 to cause further buckling, and since the sheet has buckled and folded along the score line 50, it then begins to feed downwardly again as shown in Fig. 13 until the sheet folds along score line 51. This buckling operation along score line 51 is illustrated by Fig. 13 with the parts shown in the position for this operation.

When this third buckling and folding operation causing the folding of sheet 48 along score line 51 is completed, as shown in Fig. 13, the rock frame has rotated to a considerable extent around shaft 6, and in further rotation of folding and feed rolls 8 and 14 the sheet will be fed downwardly almost at right angles to supporting plate 42. As a result, this downward feeding of the sheet, with the portion between folding rolls 8 and 14 and folding lip 43 tending to resist further buckling, the folding lip and the folding rolls will cooperate to feed and guide the sheet downwardly between folding roll 8 and creasing roll 74. Creasing roll 74 is rotatably mounted in bearing blocks 75 (Fig. 7), slidably mounted in guide brackets 45 on top of the side frames. Springs 76 normally operate bearing blocks 75 to slidably move them for engaging the periphery of creasing roll 74 with folding roll 8.

This downward feeding of folder sheet 48 with the folds formed therein as shown in Fig. 13, between creasing roll 74 and folding roll 8 causes these rolls to grip and pull the folded sheet downwardly. As the scored portions of the sheet that have thus been folded pass between rolls 8 and 74 the folds are firmly creased in the paper and the folder is fed fold portion first, downwardly in the machine. When this point in the operation is reached cam 67 then rotates to a position so that roller 71 begins to ride out of recess 56 is view of which the rock frame is moved back to the vertical position as shown in Fig. 10 whereupon rollers 21 ride up onto the high part of cams 20 and secondary feed and folding roll 14 is elevated to disengage its periphery from roll 8.

As the folded sheet is fed downwardly in the machine by rolls 8 and 74, it will be seen that cam 34 will then rotate into a position for operating feed rollers 41 to engage and feed the next sheet onto belts 31 and into the machine through rollers 8 and 14 against stops 47, to repeat the operation above described, on the next sheet.

As the folded sheet leaves folding roll 8 and creasing roll 74, it then progresses downwardly between a plurality of cutting knives 77 and 78 mounted on rotatable shafts 79 and 80, respectively. Shaft 80 is rotatable in bearings in the side frames of the machine, while shaft 79 is rotatably mounted in slidable bearing blocks 81, slidable on guide brackets 82 mounted on the frame of the machine and having springs 83 operating bearing blocks 81 to normally move cutters 77 toward cutters 78. Cutters 77 and 78 coact with one another in pairs, in their cutting operation; and in the machine as disclosed in the drawings, there are three pairs of these cutters, one in the center of the machine and one pair at each side of the machine. These cutters are spaced apart at a distance equal to the width of a folder to be made on the machine, and the arrangement disclosed forms two folders one on each side of the center pair of cutters, which splits the sheet in half, while the side cutters trim the outer side edges of the sheet whereby two folders are formed having a width equal to the dimension between the center pair of cutters and the side pairs respectively.

Cutter shafts 79 and 80 also carry coacting feed roll sections 84 and 85 respectively, located between the cutting knives that operate to grip the folder as it passes between the cutters, hold it in position and feed it downwardly in the machine. Cutter shafts 79 and 80 are driven by intermeshing gears 86 on shaft 79, 87 on shaft 80, and idle gear 88 intermeshing with gears 87 and driving gears 17 on shaft 6, as shown in Fig. 6.

The folder then passes between guide plates 89 and 90 carried by spaced supporting rods 91 and 92 respectively, extending in spaced parallel relation between the side frames of the machine and appropriately supported by portions of the frame of the machine. These guide plates 89 and 90 guide the two folders passing downwardly in parallel relation after leaving the cutters between feed rolls 93 and 94 respectively, rotatably mounted at opposite ends in the side frames of the machine. The bearings for roll 93 are formed in slide blocks 95 with springs 96 normally urging the slide blocks toward the bearings of roll 94 so the periphery of roll 93 is normally urged toward the periphery of roll 94.

This not only serves to feed the pair of folders simultaneously and downwardly in the machine, but also aids in further creasing the fold portions in the folders. Feed rolls 93 and 94 feed the folders downwardly between another pair of guide plates 97 and 98 mounted on spaced parallel cross rods 99 and 100 respectively, secured at their ends in the side frames of the machine, this structure being particularly illustrated in Fig. 4.

Feed rolls 93 and 94 are driven by intermeshing gears 101 and 102 as shown in Fig. 6 through gear 103 intermeshing with gear 101 and gear 87. Gears 101 and 102 are mounted on rolls 94 and 93 respectively, so that these feed rolls are positively driven in the operation of the machine in the proper timed relation with the remaining movable parts of the machine.

As the folder leaves feed rolls 93 and 94 and passes between guide plates 97 and 98, it is then fed between three delivery rolls 104, 105 and 106, rolls 105 and 106 being spaced apart in parallel relation and roll 106 having peripheral engagement with roll 104 as clearly shown in Fig. 4. These delivery rolls have their ends mounted in bearings in the side frames of the machine, roll 104 having bearings in slide blocks 107 (Fig. 1), actuated by springs 108, and arranged so that roll 104 is normally actuated toward rolls 105 and 106 to normally engage the periphery of roll 104 with the peripheries of rolls 105 and 106.

As a folder is received by these delivery rolls, it will be seen that it first passes between rolls 104 and 105 and is then directed slightly laterally between rolls 104 and 106. In order to prevent the folded edge of the folder from projecting between rolls 105 and 106 a guide plate 109, see Fig. 4, is extended between rolls 105 and 106 and mounted at opposite ends on the side frames of the machine. At the free edge extending adjacent to roll 104, but in spaced relation thereto, guide plate 109 is formed with a laterally extending guide lip 110. This guide lip 110 guides the folder laterally to insure its engaging between rolls 104 and 106 for delivery in angular relation downwardly onto delivery table 111 mounted on the main frame of the machine and extending between the side frames. One end of this delivery table is located under roll 106 and the opposite end projects outwardly from the end of the main frame of the machine to the right-hand side thereof, as shown in Fig. 4.

Figure 2:
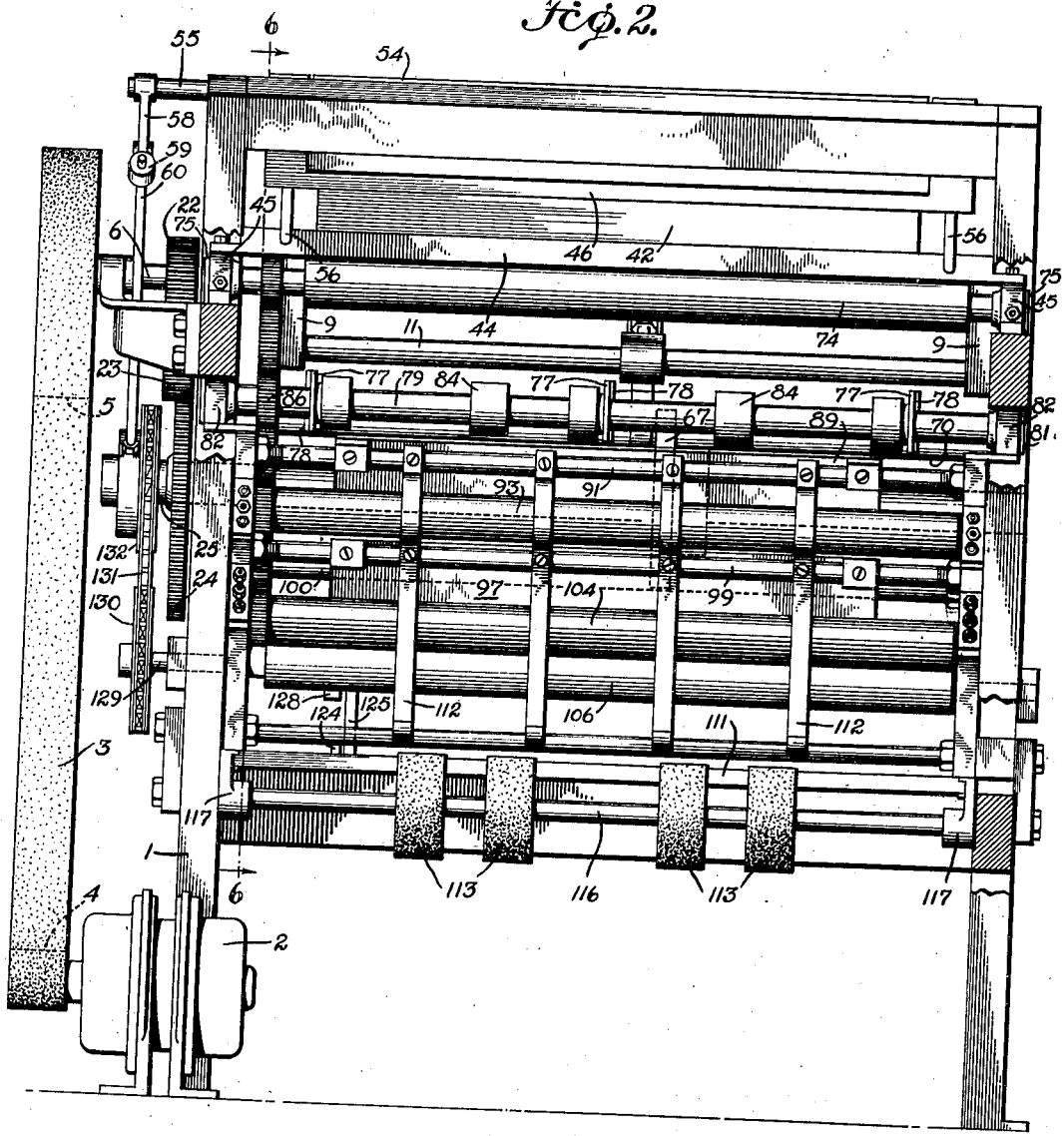
Fig. 2 shows an end elevation of the folder machine looking at the end where the finished folders are delivered.
Figure 5:
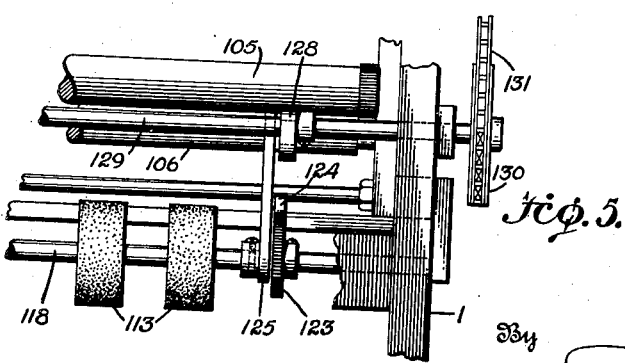
Fig. 5 is a fragmentary view showing part of the folder delivery mechanism for the purpose of illustrating the delivery actuating mechanism from a position at right angles to that shown in Fig. 4.

A plurality of spring guide arms 112 are mounted on cross rods 91 and 99, as shown in Figs. 2 and 4. These guide arms 112 operate to guide the folders being delivered from delivery rolls 104 and 106 downwardly onto delivery table 111 so as to hold them on the delivery table and cause the free ends of the folders to snap downwardly as they leave delivery rolls 104 and 106. These delivery rolls further operate to crease the folded portions of the folder. A plurality of endless delivery belts 113 have their upper flights slidably engaged on the top surface of table 111 as shown in Fig. 4 and extend beyond opposite ends of the delivery table where they engage over the peripheries of supporting rollers 114 and 115, respectively. Rollers 114 are mounted on shaft 116 rotatable in bearings 117, (Fig. 1), carried by the outer end of the delivery table. Rollers 115 are mounted on rotary shaft 118 having its opposite ends rotatably mounted in bearings in the side frames.

As shown in Fig. 6 the delivery rolls 104, 105 and 106 are driven by gears 119, 120 and 121 respectively, in which gear 121 intermeshes with gear 119 and gear 119 in turn meshes with gear 120. Gear 120 is driven by idle gear 122 intermeshing with gear 101 resulting in the positive operation of the delivery rolls in proper timed relation with remaining parts of the machine.

Delivery belts 113 of the folder delivery mechanism are intermittently driven so that the folders are delivered in offset overlapping relation by this delivery mechanism from the folder machine. To secure this operation, ratchet 123 is mounted on shaft 118 and has pawl 124 carried by oscillating feed lever 125 adapted for coacting therewith to rotate shaft 118 in a clockwise direction as shown in Fig. 4. Feed lever 125 has one end rotatably mounted on shaft 118 to provide the proper support for this feed lever, while tension spring 126 is connected to the feed lever at one end and to one of the cross bars of the main frame at the opposite end, as shown in Fig. 4. Spring 126 normally operates the feed lever 125 in a counter-clockwise direction as shown in Fig. 4, so roller 127 on the free end thereof will be maintained in engagement with the periphery of operating cam 128 mounted on rotatable shaft 129. Shaft 129 is rotatably mounted at its opposite ends in suitable bearings carried by the side portions of the main frame of the machine.

The outer end of shaft 129 carries sprocket wheel 130 operated by drive chain 131 engaging over sprocket wheel 132 mounted on shaft 25 as shown in Fig. 1. It will be seen from this construction and operation of the delivery mechanism for the folders, that they will be continuously delivered by the delivery rolls onto delivery table 111 and the upper flights of delivery belts 113 which will move the folders delivered thereto intermittently toward the outer end of the delivery table at the right-hand side of the machine as shown in Figs. 1 and 4. Also, that subsequent completed folders will be delivered on top of the previous folders but slightly offset therefrom, in the manner indicated diagrammatically in Fig. 4. Guide fingers 112 are resilient and through their resiliency they operate to hold the folders in position as they are delivered from the delivery roll and cooperate in positioning them in the offset relation on the delivery table.

The operation of the machine serves to continuously feed single pre-scored sheets successively by means of the feed mechanism including belts 31 against stops 47. Then, through the operation of the folding mechanism the plurality of alternate and oppositely extending folds are formed in the sheet immediately after the tab cutter has operated to cut the tab in one end of the sheet. The sheet is next fed through the cutters for trimming the sheet to form the pair of folders of desired width. Following this, the folders progress through the machine to be delivered onto the delivery table by the plurality of feed and delivery rolls which aid in further creasing the folds in the sheet in addition to the creasing operation obtained by the creasing rolls. The folded sheets are progressively fed through the machine one after another, one sheet at a time, and as a result the formation of these W-type folders is progressive and continuous through the successive feeding of sheets for folding, into the machine from table 29.

The tab cutter may be dispensed with when it is not desired to tab cut the sheets, merely by dispensing with the operation of the movable cutter, but allowing stops 47 to be positioned at the proper distance from the feed and folding mechanism so as to obtain the folding of the sheets without cutting tabs.

It will be understood that the feed mechanism including belts 31 for feeding the sheets into the machine, feeds sheets successively through the folding mechanism including rolls 8 and 14 until they engage stops 47, and that rolls 8 and 14 do not come into operation until after the sheet has engaged stops 47. The next sheet will be fed into the machine after a previous folded sheet has been folded and as the end of the sheet passes between rolls 8 and 74. The timing of the speed and folding of the sheets may be varied, and adjustment of stops 47 may be made for different sizes of sheets in making different sizes of folders. The pairs of cutters 77 and 78 may also be adjusted longitudinally on the cutter shafts 79 and 80 for changing the width of the folders by providing set-screws in the usual manner for retaining the cutters in position on the shafts, the cutters being otherwise slidable longitudinally of the shafts so that they may be adjusted when the set-screws are loosened. While the machine is illustrated for making two folders simultaneously from a single sheet, it is to be understood that the machine might also be set up for making a single folder or for making more than two folders as may be desired, without departing from the scope of the invention as disclosed.

The invention claimed is:

1. A machine for making W-type folders comprising a stop member, sheet feeding means for feeding a sheet against said stop, and coacting feeding and folding rolls, means supporting one of said rolls for movement about the other, said rolls being operable to engage said sheet after engaging said stop for feeding said sheet toward said stop, said one roll being movable about the other during said feeding to simultaneously buckle said sheet alternately in opposite directions adjacent said rolls for successively forming a series of folds in said sheet.

2. In a folding machine, a stop member, sheet feeding means for feeding a folder sheet having a series of parallel scored portions against said stop, and folding means, means for varying the plane of said folding means relative to said stop member for changing the plane of feed, said stop member and folding means being arranged so the scored portion of said sheet will lie adjacent said folding means when one end of said sheet engages said stop member, said folding means gripping and feeding said sheet toward said stop member and simultaneously moving to change the plane of feed of said sheet thereby for alternately buckling said sheet at said scored portions in opposite directions to produce a series of folds in said sheet.

3. In a folding machine, a stop member, folding means in advance of said stop member, means for feeding a sheet through said folding means to engage said stop with a portion of the sheet in said folding means, said folding means comprising a pair of rotatable coacting rolls, a rocking frame rotatably carrying one of said rolls rotatably mounted coaxially with the other rolls and means for rotating said rolls to engage and feed said sheet toward said stop member and simultaneously rock said frame for changing the plane of the axes of said rolls for causing said sheet to alternately buckle at successive portions in opposite directions and form a plurality of folds in said sheet.

4. In a folding machine, a stop member, folding means in advance of said stop member comprising a pair of coacting feed rolls, a rockable frame rotatably mounting one of said feed rolls for circular movement coaxially about the other, means for rocking said frame and rotating said feed rolls, means for separating said feed rolls into non-feeding relation in one position of said frame, and means for feeding a sheet between said feed rolls in separated relation to engage said stop member, said rocking means being operable when a sheet engages said stop member to rock said frame and change the plane of said feed rolls to engage said feed rolls with said sheet for feeding the sheet toward said stop member in said rotating and rocking movement to buckle the sheet alternately in opposite directions in successive portions for forming a plurality of folds in said sheet.

5. In a folding machine, a stop, paper guiding means, a pair of feeding and folding rolls, means for varying the plane of said rolls relative to said stop, said rolls coacting to engage and feed a sheet of paper against said stop and having the plane of said rolls variable relative to said stop to buckle said paper between said rolls and guiding means while engaging said stop to successively form folds in said paper extending alternately in opposite directions.

6. In a folding machine, a stop, and a pair of coacting folding and feeding rolls rotatable to engage and feed a paper sheet against said stop, sheet holding and guiding means between said rolls and stop, means supporting and moving one of said rolls coaxially about the other roll a limited amount and rotatably cooperating in said movement in simultaneously feeding said sheet to cause said sheet to buckle adjacent to said rolls and successively form a plurality of fold portions alternately extending in opposite directions.

7. In a folding machine, a stop, paper guiding means, a pair of feeding and folding rolls, means mounting said rolls having parts operable to change the relative position of said rolls to said stop, said rolls coacting in movement relative to said stop to grip and feed a paper sheet against said stop and to continue said feeding in said relative movement to buckle said sheet adjacent said rolls through cooperation of said stop and guiding means with said rolls for successively forming a plurality of folds extending alternately in opposite directions, and means for creasing the folds in said sheet adjacent said folding rolls.

8. In a folding machine, a stop, paper guiding means, a main feed and folding roll, a coacting secondary feed and folding roll, means mounting and oscillating said secondary feed and folding roll, said rolls gripping and feeding a paper sheet through said guide means against said stop and continuing said feed to cause said sheet to buckle adjacent said main feed roll during the oscillation of said secondary feed roll and in cooperation with said guiding means for alternately folding said sheet in opposite directions, and a creasing roll coacting with said main feed and folding roll for receiving said sheet in folded relation after formation of said folds and creasing said sheet along said folds, said creasing roll and main feed and folding roll also coacting to deliver said sheet from said rolls.

9. In a folding machine, a stop, paper guiding means, a main feed and folding roll, a secondary folding roll coacting with said main feed roll to feed a paper sheet against said stop and continue said feed of paper in cooperation with said stop and guiding means to cause said sheet to successively buckle in opposite directions to form a plurality of folds, means mounting said secondary folding roll for limited concentric movement on its axis around said main feeding and folding roll to cooperate during the feeding and buckling of said sheet to form said folds, and creasing means coacting with said main feed and folding rolls for receiving the folded sheet and creasing said folds, and for delivering said sheet from said machine in folded relation.

10. In a folding machine, a paper guiding means, a stop at one end thereof, a main folding and feed roll at the other end thereof, a secondary folding and feed roll resiliently mounted for normally having peripheral engagement with said main feed roll for receiving a paper sheet between said rolls and feeding said sheet through said guiding means to engage said stop, means mounting said secondary folding and feed roll for oscillating movement concentrically about the axis of said main folding and feed roll for cooperation in continuing the feeding of said sheet for causing it to alternately buckle in opposite directions to form a plurality of folds in the central portion of said sheet, and a creasing roll resiliently projected for normally engaging said main folding and feed roll and adapted to receive said sheet between said rolls in folded relation for creasing said folds and delivering said sheet from said rolls in folded relation.

11. In a folding machine, a sheet guiding plate, a paper stop at one end, a fold forming lip on the opposite end, a pair of folding and feed rolls, means mounting said rolls for movement of one of said rolls relative to and adjacent said lip for feeding a sheet of paper in angular relation into engagement with said guiding plate and stop, said rolls continuing to feed said sheet toward said stop in movement relative to said lip for buckling said sheet between said rolls and guiding plate onto said lip to successively fold said sheet alternately in opposite directions against said lip at a plurality of adjacent places, and creasing means for receiving said sheet in folded relation, creasing said folds and delivering said sheet from said rolls in folded relation.

12. In a folding machine, a sheet guiding plate, a paper stop at one end, a fold forming lip on the opposite end, a pair of coacting rotatable folding and feed rolls, means mounting said rolls for movement of one of said rolls relative to and adjacent said lip for feeding a sheet of paper into said guiding plate, against said stop and for continued feeding in movement relative to said lip and rotation thereof to buckle said sheet between said rolls and guiding plate onto said lip to successively fold said sheet alternately in opposite directions against said lip at a plurality of places.

13. In a folding machine, a sheet guiding plate, a paper stop at one end, a fold forming lip on the opposite end, a pair of folding and feed rolls, a rocking frame rotatably mounting one of said rolls and rotatably mounted coaxially with the other feed roll, and means for operating said feed rolls and rocking said frame for gripping and feeding a sheet of paper into said guiding plate, against said stop and for continued feeding during the rocking of said frame to buckle said sheet against said lip to form fold portions in the sheet extending alternately in opposite directions.

14. In a folding machine, a sheet guiding member, a paper stop at one end, a fold forming lip on the opposite end, a rocking frame mounted adjacent and movable toward and from said lip, a pair of folding and feed rolls, one of said rolls being mounted on said frame, and the other roll and said frame being in coaxial relation, means for holding said feed rolls in non-feeding relation in one position of said frame, sheet feeding means for feeding a paper sheet between said rolls in said one position onto said guiding member to engage said stop, and means for actuating said feed rolls and rocking frame after said sheet engages said stop to grip and feed said sheet toward said stop for buckling said sheet between said rolls and lip to form a series of folds in said sheet extending alternately in opposite directions.

15. In a folding machine, a sheet guiding member, a tab cutting device at one end of said member having a stop, a pair of folding and feeding rolls at the other end of said guiding member, means rotatably mounting said rolls having parts mounting one roll for movement about the other relative to said guiding member, means for holding said folding and feed rolls in non-feeding relation, sheet feeding means for feeding a sheet between said folding and feed rolls and on said sheet guiding members to engage said stop and tab cutting device, and means for operating said tab cutting device to tab-cut said sheet and for operating said folding and feed rolls to coact and feed said sheet toward said stop and move said one roll relative to said guiding member to buckle the sheet between said folding and feed rolls and said guiding member to successively form a plurality of folds in said sheet extending alternately in opposite directions.

16. In a folding machine, a frame, a main folding and feed roll rotatably mounted on said frame, a rock frame mounted for rocking movement on said frame concentrically with said main folding and feed roll, a secondary folding and feed roll slidably and rotatably mounted on said rock frame, for normally coacting with said main folding and feed roll to grip and feed sheets, a sheet guiding member carried by the frame and having one end positioned adjacent said folding and feed rolls to receive sheets fed between said rolls, a stop at the other end of said guide member, means on the frame for sliding said secondary folding and feed roll in said rock frame into an inoperative position relative to said main folding and feed roll in one position of said rock frame, sheet feeding means having a member operable periodically to feed a sheet between said folding and feed rolls into said guiding member to engage said stop, power actuated means for operating said sheet feeding means and its periodically operable member to successively feed sheets to engage said stop, connections between said rock frame and power actuated means for actuating said rock frame and said folding and feed rolls in timed relation to grip a sheet in engagement with said stop and feed said sheet toward the stop to buckle said sheet during movement of said rock frame between said rolls and guide member to successively form a series of folds in said sheet extending alternately in opposite directions.

17. In a folding machine, a sheet guiding member, a paper stop at one end thereof, a pair of folding and feed rolls at the opposite end operable to feed a sheet toward said stop, means mounting said rolls operable to vary the plane of their axes relative to said guiding member to buckle said sheet, after engaging said stop, between said guide member and folding and feed rolls to successively fold said sheet at a plurality of places to extend alternately in opposite directions, said folding and feed rolls feeding the folded portion of said folded sheet laterally to the plane of the sheet in said guide member and rolls, a creasing roll coacting with one of said folding and feed rolls receiving said folded portion of the sheet and firmly creasing said folds, said creasing roll cooperating with said feed rolls in delivering the folded creased folder from said machine.

18. In a folding machine, a sheet supporting and guide means, a stop at one end thereof, sheet feeding and folding means for feeding a sheet against said stop and, means for changing the relative position of said sheet feeding and folding means relative to said stop for buckling said sheet to form a series of folds extending in opposite directions to form a folder and means for delivering a completed folder from said feeding and folding means.

19. A method of making folders consisting in holding a normally flat sheet with one end in obtuse angular relation to the other end, buckling said sheet transversely across the central portion successively in opposite directions along spaced parallel lines to form a plurality of reversely folded portions, and creasing said folds to form a completed expansion folder.

20. A method of making W-type folders consisting in holding a normally flat paper sheet, buckling the central portions transversely of the sheet alternately in opposite directions to successively form a plurality of reversely folded portions, and subsequently creasing said folded sheet to form a completed expansion folder.

21. A method of making W-type folders consisting in holding a normally flat paper sheet, provided with a plurality of spaced parallel scored lines therein alternately formed on opposite sides of said sheet in the central portion thereof, buckling the central portion of said sheet alternately in opposite directions to form folds in said sheet extending alternately in opposite directions along said scored lines and creasing said folded sheet to form a completed W-type folder.

22. A folder making machine, comprising a paper guide and stop, and means in advance thereof having parts operable to engage and feed a sheet of paper toward said stop and other parts cooperating with said first-mentioned parts operable in continued feeding of said sheet while engaged with said stop to cause the same to alternately and successively buckle in opposite directions to form a plurality of adjacent folds.

23. In a folding machine of the buckle type, a buckle chute having a stop at one end, means associated with said chute for operating on a paper sheet while engaged with said stop, means for feeding paper sheets successively against said stop, and folding means at the opposite end of said chute constructed and operable to form a plurality of folds in a paper sheet while engaged with said stop.

24. In a folding machine of the buckle type, a buckle chute, a stop at one end thereof, a tab cutter at said end operable to cut a paper sheet while engaged with said stop, and folding means for engaging and producing a fold in a paper sheet while engaged with said stop.

GUSTAV EWALD.
BURNS T. McGARY.